(12) United States Patent
Brown et al.

(10) Patent No.: US 8,903,063 B2
(45) Date of Patent: *Dec. 2, 2014

(54) DESTINATION DEVICE BILLING ACCORDING TO CALL RECIPIENT

(71) Applicant: eBay Inc., San Jose, CA (US)

(72) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,283

(22) Filed: Nov. 6, 2013

(65) Prior Publication Data

US 2014/0064469 A1    Mar. 6, 2014

Related U.S. Application Data

(60) Continuation of application No. 13/368,066, filed on Feb. 7, 2012, now Pat. No. 8,588,384, which is a continuation of application No. 12/181,728, filed on Jul. 29, 2008, now Pat. No. 8,139,736, which is a continuation of application No. 11/158,886, filed on Jun. 22, 2005, now Pat. No. 7,426,263, which is a division of application No. 10/023,407, filed on Dec. 17, 2001, now Pat. No. 6,977,998.

(51) Int. Cl.
*H04M 15/00* (2006.01)
*C09K 8/68* (2006.01)
*H04M 15/08* (2006.01)

(52) U.S. Cl.
CPC ...... *H04M 15/08* (2013.01); *H04M 2215/0168* (2013.01); *H04M 2215/0156* (2013.01); *H04M 15/48* (2013.01); *C09K 8/68* (2013.01); *H04M 15/73* (2013.01); *H04M 2215/7072* (2013.01); *H04M 2215/7254* (2013.01); *H04M 2215/724* (2013.01); *H04M 2215/0152* (2013.01); *C09K 2208/30* (2013.01); *H04M 15/90* (2013.01); *C09K 2208/26* (2013.01); *H04M 15/77* (2013.01); *H04M 15/765* (2013.01); *H04M 2215/016* (2013.01); *H04M 2215/68* (2013.01); *H04M 15/80* (2013.01)
USPC ............ 379/114.21; 379/114.01; 379/127.05

(58) Field of Classification Search
USPC ............ 379/114.01, 114.05, 114.21–114.23, 379/127.05; 455/405–408
See application file for complete search history.

(56) References Cited

U.S. PATENT DOCUMENTS 4,706,275 A    11/1987   Kamil
4,953,204 A    8/1990    Cuschleg, Jr. et al.

(Continued)

FOREIGN PATENT DOCUMENTS

EP    0585004    3/1994
EP    0676882    10/1995

(Continued)

*Primary Examiner* — Quoc D Tran
(74) *Attorney, Agent, or Firm* — Haynes and Boone, LLP

(57) ABSTRACT

A method, system, and program for billing for service provided to destination device according to the calling plan of the individual receiving the call. An authenticated identity for a callee answering a call placed to a destination device is received at an intermediary device. The intermediary device then accesses a billing plan for the authenticated identity of the callee and loads the billing plan for specifying charges for the call, such that telephone service billed to the callee is accessible at multiple destination devices.

18 Claims, 8 Drawing Sheets

(56) References Cited

U.S. PATENT DOCUMENTS

| | | |
|---|---|---|
| 5,014,298 A | 5/1991 | Katz |
| 5,148,474 A | 9/1992 | Haralambopoulos et al. |
| 5,206,899 A | 4/1993 | Gupta et al. |
| 5,311,574 A | 5/1994 | Livanos |
| 5,381,467 A | 1/1995 | Rosinski et al. |
| 5,444,774 A | 8/1995 | Friedes |
| 5,499,288 A | 3/1996 | Hunt et al. |
| 5,561,707 A | 10/1996 | Katz |
| 5,568,541 A | 10/1996 | Greene |
| 5,572,587 A | 11/1996 | Gaglani |
| 5,602,907 A | 2/1997 | Hata et al. |
| 5,673,404 A | 9/1997 | Cousins et al. |
| 5,754,633 A | 5/1998 | Levy |
| 5,754,663 A | 5/1998 | Goldfarb |
| 5,790,637 A | 8/1998 | Johnson et al. |
| 5,805,680 A | 9/1998 | Penzias |
| 5,822,411 A | 10/1998 | Swale et al. |
| 5,825,857 A | 10/1998 | Reio et al. |
| 5,859,900 A | 1/1999 | Bauer et al. |
| 5,864,617 A | 1/1999 | Donnelly |
| 5,867,572 A | 2/1999 | MacDonald et al. |
| 5,872,834 A | 2/1999 | Teitelbaum |
| 5,903,642 A | 5/1999 | Schwartz et al. |
| 5,905,793 A | 5/1999 | Flockhart et al. |
| 5,915,001 A | 6/1999 | Uppaluru |
| 5,937,044 A | 8/1999 | Kim |
| 5,940,476 A | 8/1999 | Morganstein et al. |
| 5,943,405 A | 8/1999 | Morikawa et al. |
| 5,946,386 A | 8/1999 | Rogers et al. |
| 5,946,654 A | 8/1999 | Newman et al. |
| 5,960,416 A | 9/1999 | Block |
| 5,978,450 A | 11/1999 | McAllister et al. |
| 5,978,467 A | 11/1999 | Walker et al. |
| 6,038,305 A | 3/2000 | Mcallister et al. |
| 6,047,051 A | 4/2000 | Ginzboorg et al. |
| 6,049,603 A | 4/2000 | Schwartz et al. |
| 6,058,364 A | 5/2000 | Goldberg et al. |
| 6,064,730 A | 5/2000 | Ginsberg |
| 6,101,242 A | 8/2000 | Mcallister et al. |
| 6,122,357 A | 9/2000 | Farris et al. |
| 6,125,178 A | 9/2000 | Walker et al. |
| 6,178,230 B1 | 1/2001 | Borland |
| 6,195,419 B1 | 2/2001 | Gilboy |
| 6,199,079 B1 * | 3/2001 | Gupta et al. ............. 715/207 |
| 6,226,364 B1 | 5/2001 | O'Neil |
| 6,236,722 B1 | 5/2001 | Gilbert et al. |
| 6,263,066 B1 | 7/2001 | Shtivelman et al. |
| 6,282,274 B1 * | 8/2001 | Jain et al. ............. 379/114.26 |
| 6,285,749 B1 | 9/2001 | Manto |
| 6,324,269 B1 | 11/2001 | Malik |
| 6,327,346 B1 | 12/2001 | Infosino |
| 6,330,315 B1 | 12/2001 | Kapsales et al. |
| 6,381,317 B1 | 4/2002 | Bala et al. |
| 6,381,329 B1 | 4/2002 | Uppaluru et al. |
| 6,522,743 B1 | 2/2003 | Hurd |
| 6,535,492 B2 | 3/2003 | Shtivelman |
| 6,542,590 B1 | 4/2003 | Player et al. |
| 6,546,238 B1 | 4/2003 | Nightingale et al. |
| 6,603,843 B1 | 8/2003 | Hagemann |
| 6,639,977 B1 | 10/2003 | Swope et al. |
| 6,768,792 B2 | 7/2004 | Brown et al. |
| 6,792,102 B2 | 9/2004 | Shires |
| 6,826,173 B1 | 11/2004 | Kung et al. |
| 6,826,276 B2 | 11/2004 | Brown et al. |
| 6,842,767 B1 | 1/2005 | Partovi et al. |
| 6,845,155 B2 | 1/2005 | Elsey |
| 6,917,672 B2 | 7/2005 | Brown et al. |
| 6,956,935 B2 | 10/2005 | Brown et al. |
| 6,959,081 B2 | 10/2005 | Brown et al. |
| 6,977,998 B2 | 12/2005 | Brown et al. |
| 6,996,216 B2 | 2/2006 | Brown et al. |
| 7,003,466 B2 | 2/2006 | Brown et al. |
| 7,076,041 B2 | 7/2006 | Brown et al. |
| 7,076,051 B2 | 7/2006 | Brown et al. |
| 7,092,508 B2 | 8/2006 | Brown et al. |
| 7,095,835 B2 | 8/2006 | Brown et al. |
| 7,095,842 B2 | 8/2006 | Brown et al. |
| 7,099,652 B2 | 8/2006 | Brown et al. |
| 7,103,172 B2 | 9/2006 | Brown et al. |
| 7,130,411 B2 | 10/2006 | Brown et al. |
| 7,139,390 B2 | 11/2006 | Brown et al. |
| 7,149,296 B2 | 12/2006 | Brown et al. |
| 7,155,412 B2 | 12/2006 | Brown et al. |
| 7,167,551 B2 | 1/2007 | Brown et al. |
| 7,200,215 B2 | 4/2007 | Brown et al. |
| 7,215,759 B2 | 5/2007 | Brown et al. |
| 7,221,738 B2 | 5/2007 | Brown et al. |
| 7,245,716 B2 | 7/2007 | Brown et al. |
| 7,289,624 B2 | 10/2007 | Brown et al. |
| 7,394,893 B2 | 7/2008 | Brown et al. |
| 7,426,263 B2 * | 9/2008 | Brown et al. ............. 379/114.21 |
| 7,486,779 B2 | 2/2009 | Brown et al. |
| 7,839,989 B2 | 11/2010 | Brown et al. |
| 8,054,957 B2 | 11/2011 | Brown et al. |
| 8,139,736 B2 * | 3/2012 | Brown et al. ............. 379/114.21 |
| 8,588,384 B2 * | 11/2013 | Brown et al. ............. 379/114.21 |
| 2002/0099670 A1 | 7/2002 | Jakobsson |
| 2003/0108158 A1 | 6/2003 | Brown et al. |
| 2003/0108159 A1 | 6/2003 | Brown et al. |
| 2003/0108160 A1 | 6/2003 | Brown et al. |
| 2003/0108163 A1 | 6/2003 | Brown et al. |
| 2003/0110039 A1 | 6/2003 | Brown et al. |
| 2003/0112936 A1 | 6/2003 | Brown et al. |
| 2003/0114139 A1 | 6/2003 | Brown et al. |
| 2003/0114142 A1 | 6/2003 | Brown et al. |
| 2003/0115070 A1 | 6/2003 | Brown et al. |
| 2003/0115138 A1 | 6/2003 | Brown et al. |
| 2004/0066916 A1 | 4/2004 | Brown et al. |
| 2005/0002497 A1 | 1/2005 | Brown et al. |
| 2005/0084077 A1 | 4/2005 | Brown et al. |
| 2005/0238151 A1 | 10/2005 | Brown et al. |
| 2005/0238163 A1 | 10/2005 | Brown et al. |
| 2006/0074685 A1 | 4/2006 | Brown et al. |

FOREIGN PATENT DOCUMENTS

| | | |
|---|---|---|
| JP | 8139797 | 5/1996 |
| JP | 10294784 | 4/1998 |

* cited by examiner

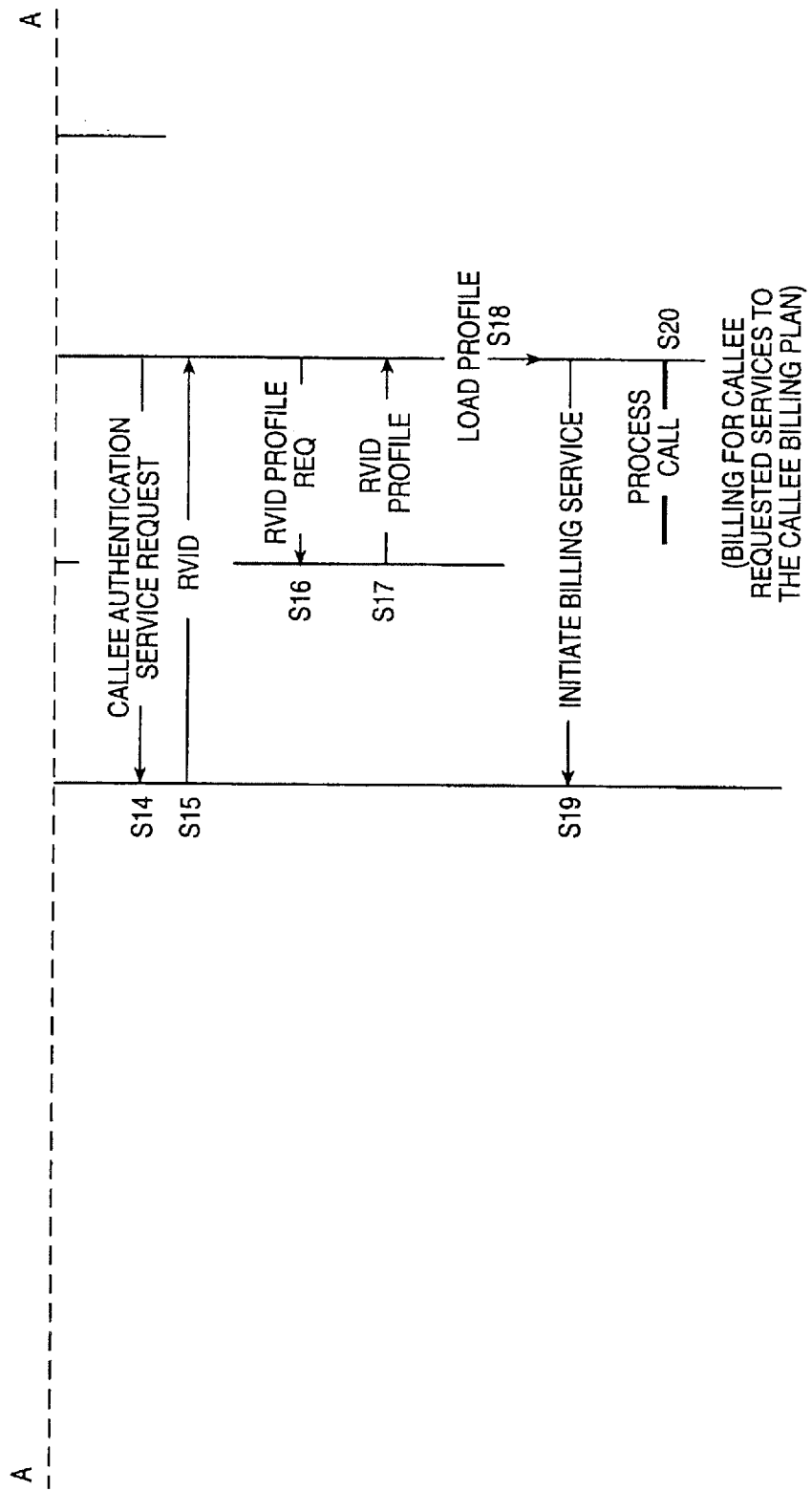

DESTINATION DEVICE BILLING ACCORDING TO CALL RECIPIENT

CROSS-REFERENCE TO RELATED APPLICATIONS

This application is a continuation of U.S. application Ser. No. 13/368,066, filed Feb. 7, 2012, which is a continuation of U.S. application Ser. No. 12/181,728, filed Jul. 29, 2008, which is a continuation of U.S. application Ser. No. 11/158, 886, filed Jun. 22, 2005 which issued as U.S. Pat. No. 7,426, 263, which is a division of U.S. application Ser. No. 10/023, 407, filed Dec. 17, 2001 which issued as U.S. Pat. No. 6,977, 998 the entirety of which are incorporated herein by reference.

TECHNICAL FIELD

The present invention relates in general to telecommunications and, in particular, to voice identification. Still more particularly, the present invention relates to billing for services provided at a destination device according to the billing plan of the callee answering the device.

BACKGROUND OF THE INVENTION

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One problem occurs where multiple people utilize a single wireless or wireline telephone number to receive calls. Only one set of services is provided to the number, regardless of who receives the call. Therefore, callees are limited to the services selected by the subscriber of a line number.

In addition, where multiple people utilize a single wireless or wireline telephone number for receiving calls, the subscriber of the line is billed for any charges incurred with use of the line. For example, a call return service that calls the number that last called, may be billed per use of the service to the line subscriber.

One of the services often billed to a line number receiving a call is a collect calling service. With a collect call, a caller dials a number to access a collect calling service provider. The collect calling service provider then prompts the caller to dial a number. The collect calling service accesses the dialed number and requests an acceptance of the collect call from the person answering the phone. Upon agreement to answer the call, the cost of the call is billed to the subscriber associated with the line number, whether or not that subscriber is the individual agreeing to receive the collect call.

Therefore, in view of the foregoing, it would be advantageous to provide a method, system, and program for specifying services available at a device utilized to receive a call according to a particular caller, where multiple callers may utilize the device to receive calls. In addition, it would be advantageous to provide a method, system, and program for billing for the use of a line and the services provided thereto according to callee, rather than according to the line subscriber, such that a callee's billing plan follows the callee to lines answered by the callee.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for billing for services provided at a destination device according to the billing plan of the callee utilizing the device.

According to one aspect of the present invention, an authenticated identity for a callee answering a call placed to a destination device is received at an intermediary device. The intermediary device then accesses a billing plan for the authenticated identity of the callee and loads the billing plan for specifying charges for the call, such that telephone service billed to the callee is accessible at multiple destination devices.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
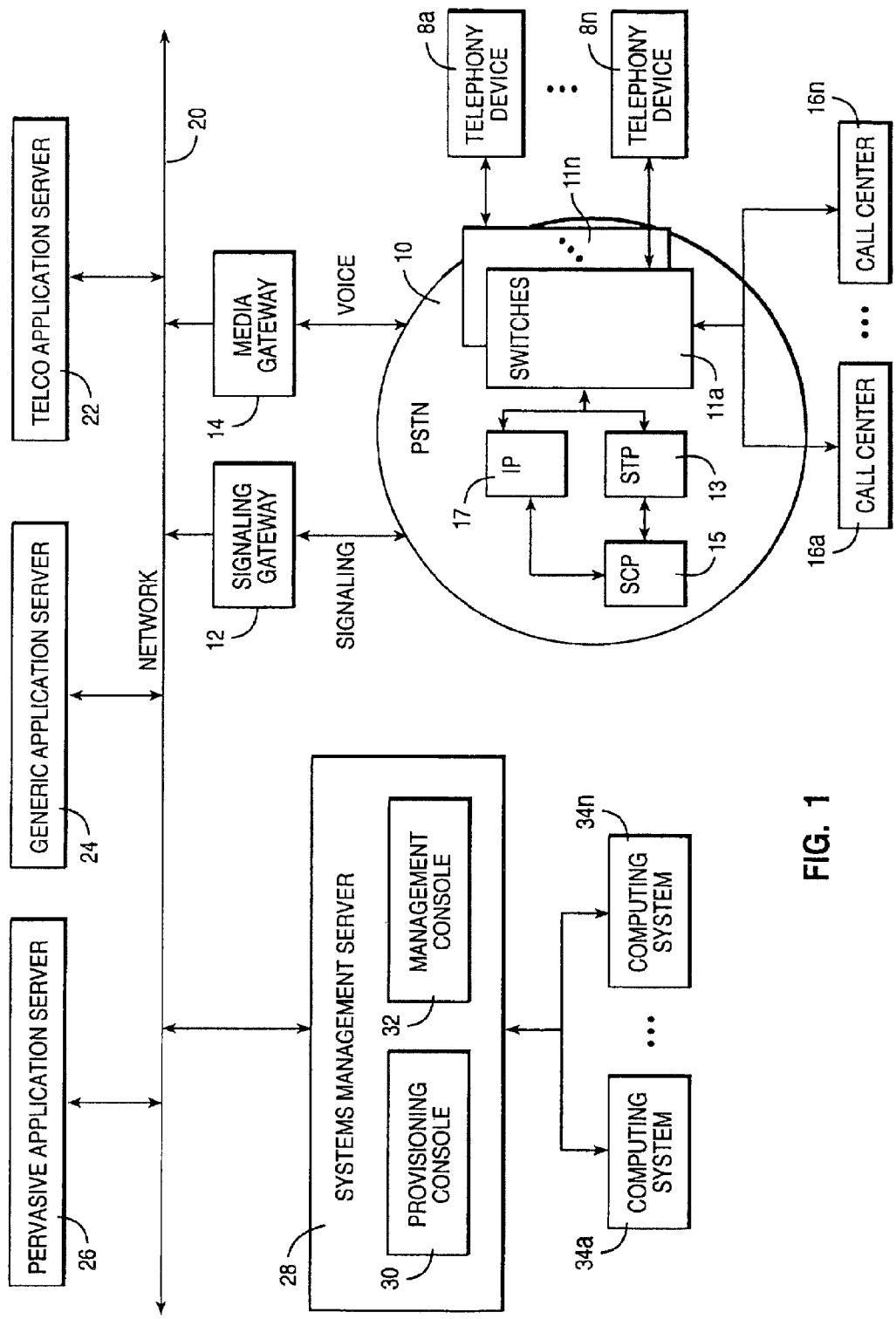
FIG. 1 depicts a block diagram of a network environment in which the present invention may be implemented.

A method, system, and program for billing for telephone transactions provided at a destination device according to the billing plan of the callee currently utilizing the device are provided.

For purposes of the present invention, telephone transactions may include telephone and generic services available from within a trusted telephone network and telephone and generic services available from servers functioning outside the trusted telephone network, as will be further described. Telephone service preferably includes the basic service of connecting a voice and signal channel between an origin device and a destination device. Generic services preferably include call services, such as call forwarding, call waiting, and long distance calling. In addition, generic services may include financial services, database management services, and other services accessible via a call.

In addition, telephone transactions may include orders initiated via a telephone. Preferably, a callee billing plan includes at least one account provider to which a charge for an order may be placed. In addition, a callee billing plan may include shipping addresses, billing addresses, and other distribution information.

First, an identity of a callee utilizing the destination device is authenticated. Callee identity authentication may be initiated by the origin device originating the call, the intermediary device processing the call, or the destination device receiving the call. Each of the devices may access a third party or external server to perform the callee identity authentication. Performance of callee identity authentication has different advantages depending on the device initiating the callee identity authentication.

While in the present invention, authentication of a caller identity is described with emphasis placed on voice authentication, other methods of caller identity authentication may also be performed. Voice samples utilized for voice authentication are just one of multiple types of biometric sampling. For example, a caller may locally provide an eye scan, a fingerprint, and other biophysical identifiers that are transmitted within or outside the trusted network to authenticate the identity of the caller. Alternatively, keypad entries, such as a pin code, account number, password, or other secure transaction key may be entered by a caller and utilized to authenticate the identity of the caller.

Next, a callee profile is accessed according to the authenticated identity of the callee utilizing the origin device. The callee profile includes a billing plan and services requested by the callee. The callee profile may be accessed from a service provider within the trusted telephone network and/or from external servers functioning outside the trusted telephone network, where the callee has selected to disclose callee profile information at those external servers.

A call received at the destination device is then processed according to the billing plan of the callee. Advantageously, by specifying the billing for use of a destination device according to the callee utilizing the device, rather than the line subscriber, additional services may be provided for the call and the callee may be billed for any services rendered to the destination device.

According to one advantage of the present invention, where a wireless telephone line is utilized, billing is typically performed for each minute of use, whether a call is originated or received at the wireless telephone line device. According to the present invention, the callee utilizing the wireless telephone line device will be billed for the minutes utilized and for the services provided, rather than billing the wireless telephone line subscriber for those minutes utilized by the callee. Thereby, multiple people may utilize a single wireless device, where billing for use is separated according to the person answering a call.

According to another advantage of the present invention, where a collect call is accepted by a callee at a destination device, the callee is billed for the collect call, rather than billing the line subscriber of the destination device. Therefore, the ability to answer calls and incur any charges associated with answering a call follows an individual to any telephony device at which the individual may answer a call. In an example, where the line subscriber is a business, it is advantageous for an employee to incur charges on the employee's billing plan for personal calls received at a telephony device accessible to the employee. In another example, a callee may forward calls to a friend's line number and then accept charges for collect calls forwarded to the friend's line number.

For purposes of the present invention, a callee preferably subscribes to a telephone service from at least one service provider. That service may be linked to a particular line number, but preferably follows the callee to whatever telephone device the callee chooses to answer. The service may include a billing plan that provides for services in addition to basic telephone service, at a flat rate. In addition, the billing plan may provide for other services, in addition to basic telephone service, that are billable according to use, such as a collect calling service and a wireless telephone service.

In addition, a billing plan may include a credit or debit account provider. Credit and debit accounts may be specified for use according to the type of charge or debit. For example, one debit account may be specified for debits for long distance service. Another debit account may be specified for debits for personal orders placed via the telephone. Yet another debit account may be specified for debits for business orders placed via the telephone.

A debit or credit to a billing plan may include, but is not limited to, a monetary amount, a points amount, electronic coupons, electronic vouchers, and other electronic payments that may be transferred. For example, a callee may receive an electronic voucher for wireless service minutes. When the callee is charged for the minutes, the electronic voucher may automatically be redeemed.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a-8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a-34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11a-11n, that originate, terminate, or tandem calls. Central office switches 11a-11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a-11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a-11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11a-11n and telco application server 22 via signaling gateway 12. In addition, a voice channel is opened between central office switches 11a-11n and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11a-11n, wherein the level of security is suitable for untrusted communications. A level of security may be implemented by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11a-11n to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11a-11n if the additional caller input is verifiable for the VID.

An origin telephony device or destination telephony device may also determine a VID and/or RVID for the caller and/or callee of a call. In particular, telephony devices 8a-8n and call centers 16a-16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a-8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a-8n.

In addition, telephony devices 8a-8n may each incorporate a display that provides a visual output of a VID or RVID. Alternatively, such a display may be provided in a separate device connected to the line in parallel to telephones 8a-8n. According to one advantage of the present invention, the identity of the actual caller or actual callee are output to a display in association with a call. In addition, other context information about the caller including, but not limited to, the device from which the call originates or is answered, ratings for a caller or callee, preferences for a call with the caller or callee, and other context information may be output to a display in association with a call.

Telephony devices 8a-8n are communicatively connected to PSTN 10 via wireline, wireless, ISDN, and other communication links. Preferably, connections to telephony devices 8a-8n provide digital transport for two-way voice grade type telephone communications and a channel transporting signaling data messages in both directions between telephony devices 8a-8n and PSTN 10.

In addition to telephony devices 8a-8n, advanced telephone systems, such as call centers 16a-16n, may be communicatively connected to PSTN 10 via wireline, wireless, ISDN and other communication links. Call centers 16a-16n may include PBX systems, hold queue systems, private network systems, and other systems that are implemented to handle distribution of calls to multiple representatives or agents.

Returning to central office switches 11a-11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a-11n. The assigned telephone number includes the area code (NPA) and exchange code (NXX) for the serving central office and four unique digits (XXXX).

Central office switches 11a-11n utilize office equipment (OE) numbers to identify specific equipment, such as physical links or circuit connections. For example, a subscriber's line might terminate on a pair of terminals on the main distribution frame of one of central office switches 11a-11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to OE number of the destination, for example to forward the call if appropriate, to apply distinctive ringing, etc.

In the present invention, when a call is answered, IP 17 or telco application server 22 may be initiated to authenticate the identity of the callee. Authentication of the identity of the caller is preferably initiated in IP 17 or telco application server 22. The authentication service may attach a verification number to the authenticated RVID that identifies that particular VID authorization. When the callee hangs up, the RVID authorization may be discarded. Different entities participating in a call may only receive portions of the RVID required for processing the call. For example, the RVID ID may not be distributed to the callee. However, the callee may receive the verification number such that the destination device may query the authentication service to verify the RVID.

When the switch terminating a call receives a RVID for the callee answering the call, the switch requests a profile for the callee. The callee profile replaces or supplements the destination line number profile, such that billing of services provided for the call are billed according to the callee billing plan. In particular, the RVID and callee profile may be filtered and portions of an RVID may be blocked from receipt by some entities.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

RVID Authentication Context

Figure 2:
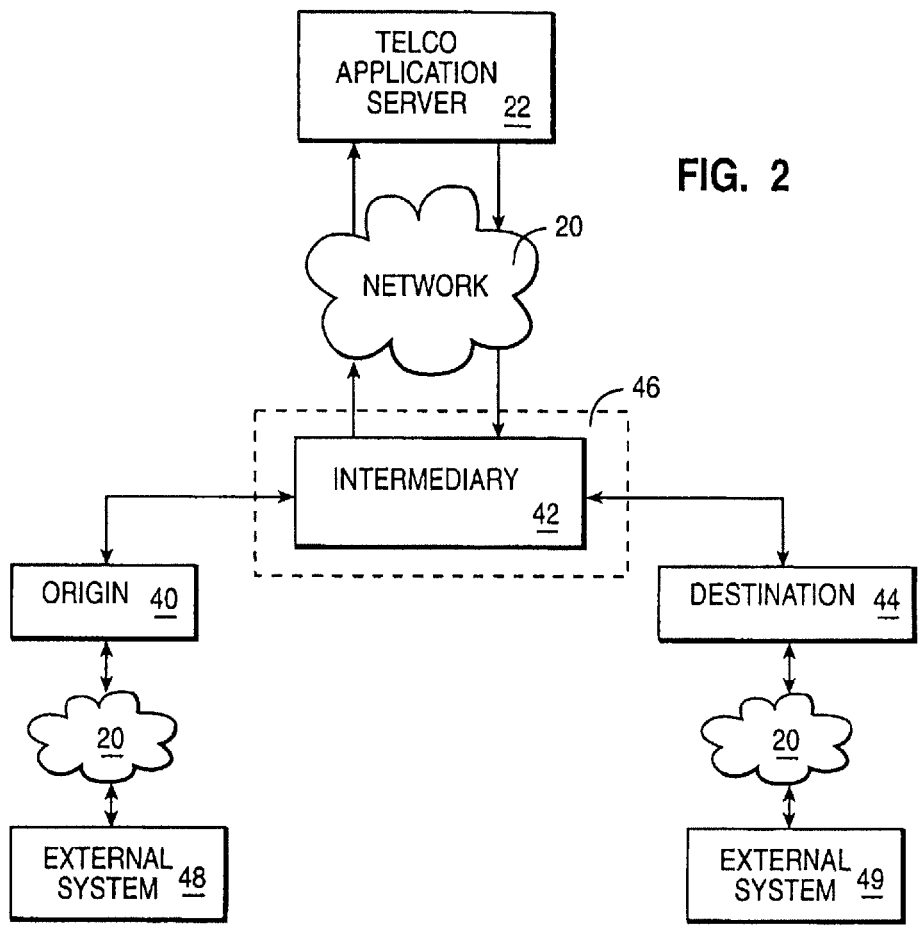
FIG. 2 illustrates a block diagram of the flow of a callee identity authentication in accordance with the method, system, and program of the present invention.

Referring now to FIG. 2, there is illustrated a block diagram of the flow of a callee identity authentication in accordance with the method, system, and program of the present invention. Origin device 40 is utilized by a caller to initiate a call. Intermediary device 42 receives the call initiation and facilitates a connection between origin device 40 and a destination device 44.

The callee answering the call at destination device 44 is prompted by a device performing caller authentication to provide a voice utterance. A RVID for the callee is provided to intermediary device 42 from the device performing caller authentication. The RVID is utilized to access a callee profile that includes service preferences and billing information. In addition, the RVID is returned to origin device 40 for identifying the callee.

In general, callee identity authentication is performed by receiving a voice utterance from a callee, analyzing the voice utterance for sound qualities and content, and attempting to match the sound qualities and content of a voice utterance to a voice template previously recorded for a callee, in order to authenticate the identity of the callee. If there is a match between the voice utterance and a voice template, then a RVID is determined for the callee and utilized to authenticate the callee identity for retrieving a callee profile and billing the callee.

Callee identity authentication may be initiated by origin device 40. In particular, origin device 40 may include voice templates and a feature for performing the callee identity authentication. In addition, origin device 40 may access a third party server 48 via network 20, where third party server 48 may provide access to a database of voice templates and/or perform the callee identity authentication. Origin device 40 will prompt a callee to provide a voice utterance at destination device 44, where intermediary device 42 facilitates communications between origin device 40 and destination device 44. Origin device 40 then transmits a RVID determined for the callee to intermediary device 42 for use in specifying services and billing for a call received at destination device 44. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, callee identity authentication may be initiated by intermediary device 42. Intermediary device 42 may include database systems that store voice templates and an IP for performing callee identity authentication. In addition, intermediary device 42 may access telco application server 22 outside of trusted telephone network 46 via network 20, where telco application server 22 provides a callee authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere7 (Websphere7 is a registered trademark of International Business Machines Corporation) servers, and other systems which provide call processing.

Further, caller identity authentication may be initiated by destination device 44. Destination device 44 may include voice templates and a feature for performing the callee identity authentication. In addition, destination device 44 may access a third party server 49 via network 20, where third party server 49 may provide access to a database of voice templates and/or perform the callee identity authentication. Destination device 44 determines and transmits a RVID for the callee to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

In the present invention, a RVID preferably authenticates the identity of a callee. However, it is advantageous that the RVID also include other information that provide a context for a call. Context for a call may be determined by a context inference engine functioning within an Intelligent peripheral of trusted telephone network 46 or within a telco application server (e.g. context inference engine 61) accessible via network 20 outside of trusted telephone network 46. In particular, the context inference engine preferably determines context from the line subscriber profile, VID, RVID, caller profile, callee profile, line numbers accessed, and other information accessible for a call. Types of context that may be determined for a call include, but are not limited to, the GPS location or time zone of the callee location, the billing plan for the call, the device at which the call is received, the subject matter of the call including whether the call is personal or business related, and whether the callee is answering on behalf of another. Further, the identity of the device that performed the callee authentication may be included in a RVID. The context inference engine preferably filters the context for the parties receiving the context according to callee preferences. Advantageously, a callee may specify billing preferences for billing transactions with the caller according to VID, such that the billing preferences are filtered to specify billing specifications for that call with the caller.

A RVID may be transferred in multiple protocols, including, but not limited to, Interface Definition Language (IDL). A RVID may include a range of information, where each type of information may be tagged or identified in some other manner. For example, the following tagged RVID may be transmitted to represent an authenticated identity of a callee:

[name] Jon Smith
[device] Jane Doe's cell phone
[location] Central Time zone
[billing plan selection] Jon's wireless provider G
[subject] Project A, business
[authenticated by] Jane Doe's cell phone (verification #4200201010), service provider G (verification #20302022202)

In another example, where the billing service filters the RVID according to the call context for placing an order, the following example of a tagged VID may be transmitted:

[name] Jon Smith
[device] Jon Smith's business phone
[service billing plan selection] Business wireline provider C
[order billing plan selection] Business credit card account provider G
[subject] order for Project C
[authenticated by] service provider C (verification #2220000220)

Callee Billing Specification Context

Figure 3:
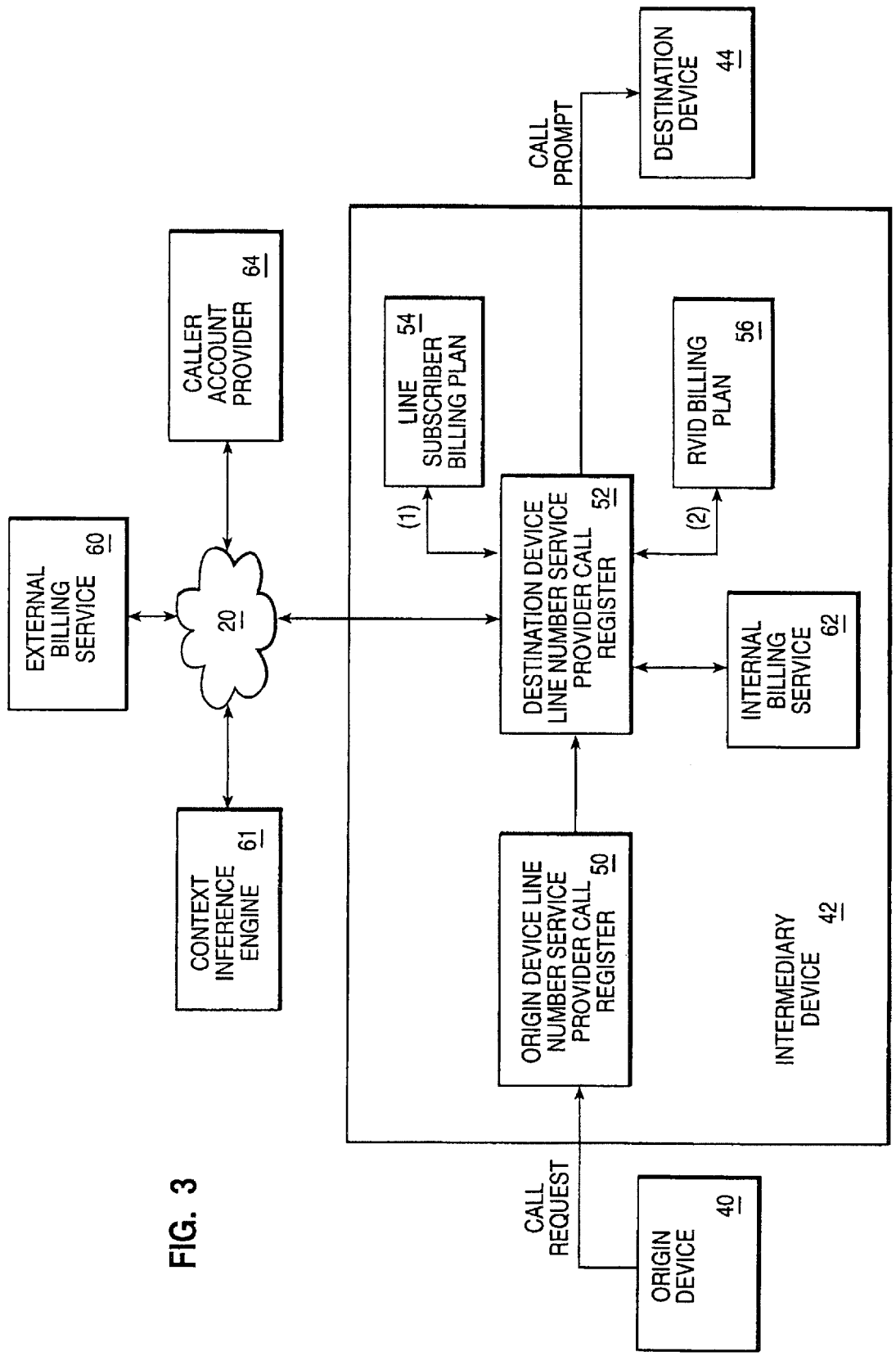
FIG. 3 depicts a block diagram of the flow of billing plans in accordance with the method, system, and program of the present invention.

With reference now to FIG. 3, there is depicted a block diagram of the flow of a billing plan in accordance with the method, system, and program of the present invention. As illustrated, origin device 40 transfers a call request to intermediary device 42. The call request may be an off-hook condition for a wireline device and a network service connection request for a wireless device.

Initially, intermediary device 42 will respond to a call request by establishing a call register 50 for the call. In particular, a particular service provider preferably provides service for the line number associated with origin device. Call register 50 is preferably within the service provider switch that is accessed by the origin device line number.

Next, intermediary device 42 may determine the service provider for the requested call destination. The service provider for the requested call destination may be the same service provider as provides the origin device line number service or may be a different service provider than that accessed for the origin device line number service.

The call is switched to the call destination service provider, where a call register 52 is established for the call. A line subscriber billing plan 54 for the call destination line number may be accessed and loaded into call register 52. Line subscriber billing plan 54 may be accessed from a database within intermediary device 42 or by accessing a database outside trusted telephone network 46.

The call is then extended via the line number connection to destination device 44. When a pickup of destination device 44 is detected, authentication of the callee identity is initiated.

Once a RVID is determined for the callee, intermediary device 42 will respond by accessing the profile for the RVID. In the example, the RVID profile includes a RVID billing plan 56 that is accessed and loaded into call register 52. RVID billing plan 56 may replace or supplement line subscriber billing plan 54 within call register 52. The call is then processed according to the billing plans available in call register 50 and call register 52.

RVID billing plan 56 may be accessed from a RVID based callee profile stored within a database accessible within trusted telephone network 46. In addition, RVID billing plan 56 may be accessed from servers external to trusted telephone network 46. In particular, a callee may choose to disclose billing information at multiple locations external to trusted telephone network 46. In addition, a callee may choose to change billing information at systems management server 28 and other servers external to trusted telephone network 46. For example, a callee may access management console 32 within systems management server 28 to update service and billing preferences according to RVID. Intermediary device 42 may then access systems management server 28 to obtain billing information according to VID.

A billing service may be initiated by a service provider to handle billing of a call according to the callee's billing plan. In the example, a billing service 60 is accessible from the telco application server via network 20 outside trusted telephone network 46. In addition, a billing service 62 is accessible within trusted telephone network 46 within an Intelligent Peripheral.

In particular, a billing service may prompt a callee to indicate, from the callee's billing plan, which service provider should be utilized to handle the call and where any additional charges for the call may be incurred. The billing service may negotiate charges between service providers. In addition, the billing service may access an elected callee account provider, such as callee account provider 64, to charge the callee for services. A callee account provider may be located within or outside trusted telephone network 46. In addition, an account provider may also be a service provider or may operate independent of a service provider. For example, an account provider may manage a debit account, a credit account, or other type of account for a callee.

In addition, a billing service may negotiate payment for an order placed by the callee with a vendor according to callee's billing plan. In particular, a telemarketer, vendor, or automated service may call the callee from a call center or other telephony device. Upon the callee agreeing to a product or service offered by the caller, the callee may authorize an order that allows the caller to bill an account provider for the callee. Advantageously, the caller needs only to initiate the billing service that receives the RVID, callee account provider selection, where the billing service is then enabled to facilitate payment from the callee account provider to a selected caller account provider.

In particular, the vendor receives the RVID and account providers from the callee billing plan. In addition, other callee profile information may indicate shipping and billing addresses. The vendor preferably loads the RVID and account providers into an order form, such that the callee need only select from among account providers to finish the order. The vendor may select one of the account providers for the form where the callee has the option to change to another account provider. In addition, in some cases only one debit account provider is available or the callee may indicate a preference for a particular account provider for orders with the vendor. Advantageously, by automatically filling in the order form, the callee need only enter or say a confirmation for the order to be processed.

Advantageously, the billing service receives the order and negotiates payment from the callee account provider according to the RVID to a vendor account provider. Alternatively, the vendor account provider may directly contact the callee account provider with the RVID. Either way, the callee account numbers may remain stored at the account provider and authentication of access to the account is provided by the RVID. Authenticating a billing transaction according to an authenticated voice identification adds more security to a callee's account than is traditionally provided by a credit card number that any person could utilized to place orders.

According to an advantage of the present invention, the vendor may transmit the order to destination device 44 in text or other format, where destination device 44 is enabled to display the order information. From the display a callee may select from account providers, shipping addresses, and other variables by keypad, voice, or touch selection. The selections are preferably transmitted as digital signal selections to the vendor for updating the order. A callee may be interacting with a representative and/or an interactive voice recognition unit (IVRU) for placing the order.

Figure 4:
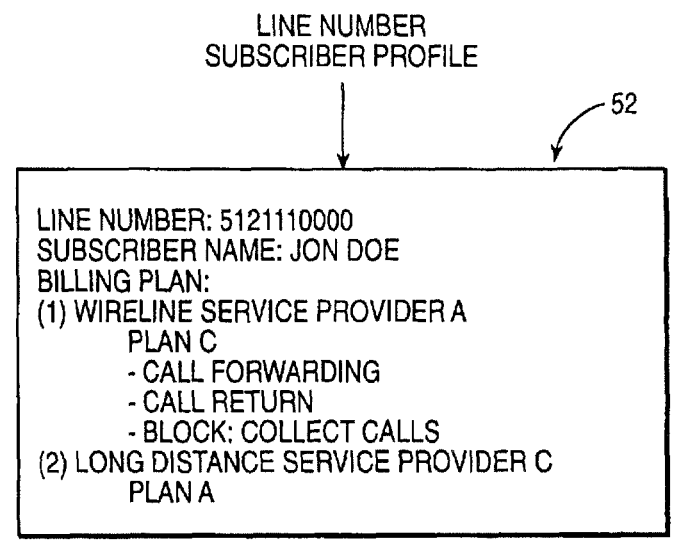
FIG. 4 illustrates an illustrative representation of the information within billing plans in accordance with the method, system, and program of the present invention.
Figure 4:
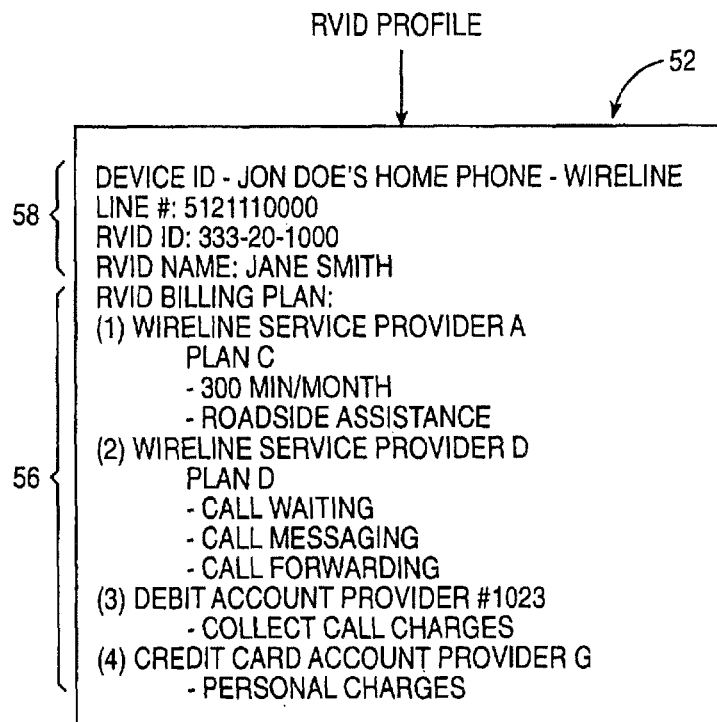

Referring now to FIG. 4, there is an illustrative representation of the information within billing plans in accordance with the method, system, and program of the present invention.

In the example, in response to a destination line subscriber profile request, a subscriber profile 54 is returned and stored within call register 50. In the example, subscriber profile 54 indicates the line number, the name of the subscriber assigned to a line number, and billing plan 54.

Subscriber billing plan 54 may include information including, but not limited to, selected service providers and other account providers. A billing plan may include one service provider utilized for general wireline service and another service provider utilized for long distance service. Further, a billing plan may include other account providers, such as a debit account provider for charging for use of a call return service or a collect call. Charges may be distributed to each of the service providers and account providers depending on the type of charge and the type of account.

According to an advantage of the present invention, the billing information for a call in call register 52 may be supplemented or replaced by RVID billing plan 56. In the example, the billing information for the RVID replaces the billing information for the line subscriber, such that service provided to the callee is billed to the callee.

In addition to billing information, RVID and context information 58 may also remain in call register 52. In the example, RVID and context information 58 includes a RVID ID, a RVID name, the line number, and an identifier for the device. In alternate embodiments, additional billing, RVID, and call context information may be included in call register 52. In particular, where the destination line subscriber and the callee are the same person, it is still advantageous to supplement call register 52 with RVID and context information 58.

In the present example, RVID billing plan 56 indicates the providers selected by the callee. First, a wireless service provider is elected under a "Plan C" offered by the wireless service provider. "Plan C" may include, for example, a certain number of minutes per month at a flat rate. Preferably, those minutes are available to the callee at any wireless device accessible to the callee.

Next, a wireline service provider is elected, where the wireline service is provided according to "plan D". "Plan D" may include, for example, a flat rate per month of use of wireline devices and several services selected by the callee. In this example, the callee has selected call waiting, call messaging, and call forwarding, to be provided under "plan D".

Further, in the example, a debit account provider is selected, where the debit account is established to pay for collect call service charges. The billing service will negotiate payment from the debit account provider to the collect caller service provider selected by a caller making a collect call.

Additionally, a credit card account provider is selected, where the credit card account is designated for charges incurred for orders placed during the call. The callee is not required to reenter billing information for each different vendor at which an order is placed. In addition, the callee is not required to disclose account numbers, just the account provider, where the authenticated RVID provides the authentication for accessing the caller account at the account provider. In particular, only portions of a callee RVID, such as the callee name, account provider and shipping address may be provided to the vendor, however the other portions of the RVID may be accessible to the billing service with the order to maintain the security of the RVID.

According to one advantage of the present invention, the charges for a collect call accepted by a callee through destination device 44 are billed to the callee, rather than the line subscriber for destination device 44. In addition, an individual may select to forward calls to a friend's house line number. Then when that individual receives a call at the friend's house line number, billing associated with services requested for the call are billed to the individual, as the callee, rather than billing the services associated with the call according to the friend's house line number profile.

Figure 5A:
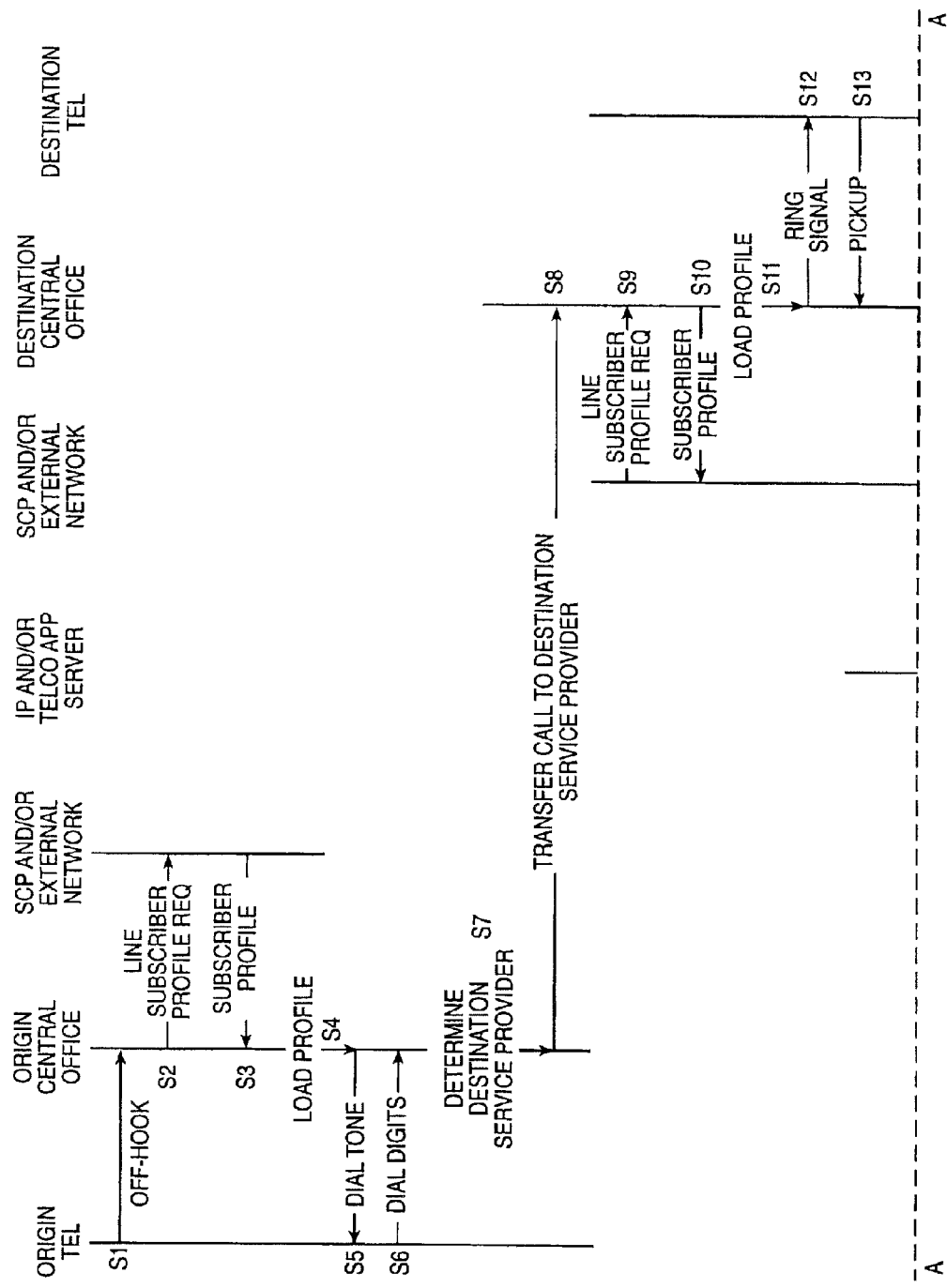
FIG. 5 depicts a flow diagram of a signal flow and processing of a call in accordance with the method, system, and program of the present invention.

With reference now to FIG. 5, there is depicted a flow diagram of a signal flow and processing of a call in accordance with the method, system, and program of the present invention. A standard telephone device is assumed for the "tel" origin device in the present example. However, a similar signal flow may be applied to other types of origin devices.

The caller lifts a handset creating an off-hook state in the origin device and a corresponding change in state of an off-hook signal to the origin central office (step S1). In response to detecting an off-hook state in the origin device, the origin central office establishes a register for the call and requests a line subscriber profile from the SCP and/or an external network server (step S2). A line subscriber profile including preferred services and a billing plan is returned to the origin central office (step S3). The origin central office loads the line subscriber profile into the call register (step S4) and extends a dial tone to the origin device (step S5).

The origin device then transmits dialed digits to the origin central office (step S6). A caller may utilize a keypad to enter a telephone number or utilize a voice dial feature if available. Dialed digits may be received at other points in the process and loaded into the call register until needed for processing the call.

Next, the origin central office determines the destination service provider for dialed digits (step S7). The origin central office may access a directory that indicates which service provider is assigned to the dialed digits. The call is then transferred to the destination service provider central office (step S8). In particular, alternatively, the origin service provider and destination provider may be the same, such that a call need not be transferred.

The destination central office establishes a call register for the call and triggers a request to the SCP or an external network server for a line subscriber profile for the destination line number (step S9). The line subscriber profile is returned, including billing information and service preferences (step S10). The destination central office loads the destination line subscriber profile into the call register (step S11) and extends a ring signal with the call to the destination device (step S12).

In response to detecting a pickup of the destination device, an off-hook pickup signal is returned from the destination device to the destination central office (step S13). Next, the destination central office extends a callee authentication service request to an IP or to the telco application server (step S14). The callee authentication server will prompt a callee to provide a voice utterance, match the voice utterance with a voice template and authenticate the callee identity as a RVID which is returned to the destination central office (step S15). Alternatively, the origin device or destination device may perform caller authentication, where the RVID is received at the destination central office from the origin device or destination device.

The destination central office updates the call register with the RVID and extends a request for a RVID based profile to the SCP and/or external network servers (step S16). The RVID based profile is returned from locations where the caller has selected to make RVID based information available (step S17). The destination central office then loads the RVID based profile, including service preferences and billing information, into the call register (step S18). In addition, the destination central office may initiate a billing service to negotiate billing for services billable to a callee during a call (step S19). In particular, the billing service may be provided internally by an IP or externally by a telco application server. For example, where acceptance of a collect call charge is agreed to by the callee, the billing service manages negotiations between the service provider for a collect call and the billing plan selected by the callee.

The call is then processed to facilitate communications between the origin device and the destination device accessed in association with the dialed digits (step S20). In particular, processing the call also includes providing services designated in the RVID based callee profile and billing for services according to the callee billing plan.

Figure 6:
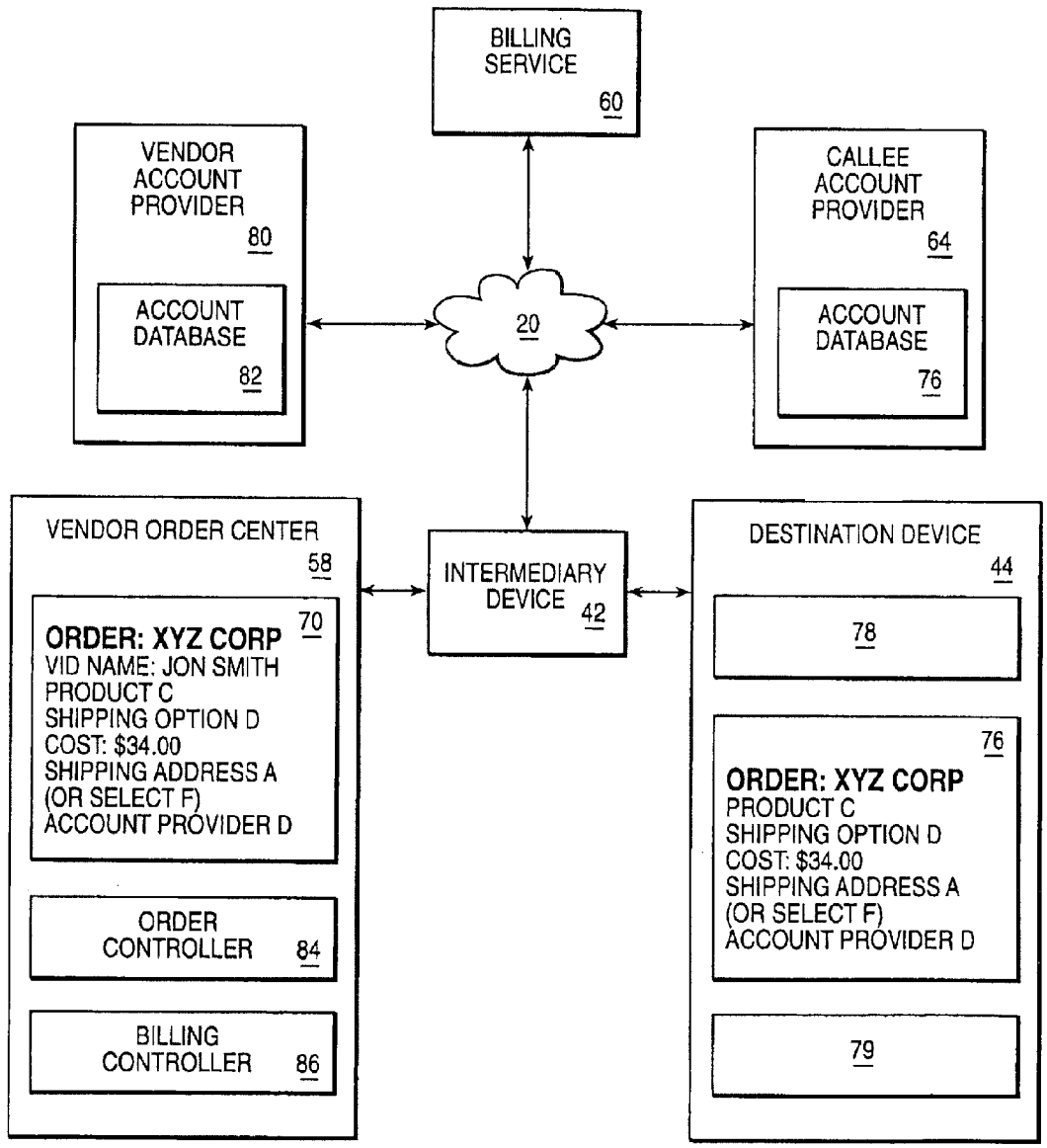
FIG. 6 illustrates an illustrative embodiment of a telephone based order in accordance with the method, system, and program of the present invention.

Referring now to FIG. 6, there is illustrated an illustrative embodiment of a telephone based order in accordance with the method, system, and program of the present invention. As depicted, a vendor order center 58 is in communication with destination device 44, utilized by a callee identified by a RVID.

In the example, the callee has placed an order from the vendor for product C. The callee name, product specification, shipping address, and account provider are loaded into the order form 70. A text or voice automated version of order form 70 may be transmitted to origin device 40.

According to an advantage of the present invention, as previously described, the context for a call may be determined by a context inference engine and forwarded to vendor order center 58 and billing service 60. The context for the call may be utilized to filter a billing plan to determine the most likely selections by the callee for the order.

An advantage of obtaining context for a call is that the context may indicate whether the call is personal or business based. If the call is personal, then a personal billing address and personal account provider may be selected automatically. If the call is business, then a business billing address and business account provider may be selected automatically by an order controller 84 within vendor order center 58 or billing service 60.

In addition, context may include scheduling information which may indicate a date by which an ordered product or service is needed. For example, if the schedule indicates a wedding date and the order is for a wedding gift, then the context indicates the number of days available for shipping. Vendor order center 58 or billing service 60 may select a shipping option that meets the target date. On a similar note, the callee profile may indicate that the callee prefers a gift wrapping service if available, such that vendor order center 58 may automatically add gift wrapping to an order if the service is available.

In particular, where multiple options are available for an entry within order form 70, vendor order center 58 may fill in the entry with the most likely callee selection. The order form transferred to the callee preferably includes the most likely selections, but provides the callee with the option to change that selection to one of the others included in the billing plan. By automatically filling in order form 70, the check-out process may be expedited. In particular, the callee is preferably provided the option to enter a single verification/authorization to complete the order during the check-out process.

Destination device 44 preferably includes a graphical user interface 76 for graphical output of the text from of order form 70. Alternatively, destination device 44 preferably includes an earpiece 78 comprising a speaker through which a voice automated version of order form 70 may be output.

The callee may provide inputs via keypad entry, voice entry or touch entry, such as with a stylus. In particular, the order received at destination device 40 is filled in with selections from the callee billing plan and callee profile. However, the callee may select from other options in the callee billing plan to change the form.

Where the callee does not have changes to the selections made for the order, the callee preferably verifies the order during the check-out process by a single entry. The single entry may comprise a keypad entry, a voice entry via microphone 79 or a stylus touch entry. The entry preferably verifies that an order is correct and may be processed.

Once the order is confirmed by the callee, billing controller 86 coordinates transmission of the order to billing service 60 with the RVID. In particular, while the RVID provided to vendor order center 58 is filtered to only show the callee's name, billing service 60 may be authorized to receive more portions of the RVID than vendor order center 58.

Billing service 60 preferably accesses callee account provider 64 with the RVID name, RVID ID, RVID verification number, charge amount and order information. Callee account provider 64 preferably includes an account database 76 that includes account numbers, balances, and transactions histories stored according to RVID. Callee account provider 64 preferably renders a payment for the order to billing service 60. Billing service 60 then routes the payment to a vendor account provider 80, where vendor account provider 80 include an account database 82 of account numbers, balances, and transactions stored according to vendor ID. Accordingly, payer and payee account information is protected from any entity except billing service 60, which is preferably a secure service.

It should be noted that while the present invention is described with reference to vendor order center 58 as a call center for controlling orders from a business entity, that business entity may be any size from a single individual to a multinational corporation. In addition, vendor order center 58 may facilitate a plurality of terminals or a single destination device terminal. Moreover, order controller 84 preferably controls automatically filling in billing related information into order form 70, but an IVRU or a representative may prompt the callee for the products and services to be ordered.

Further, it should be noted that while the present invention is described with reference to billing a callee for payment of an order placed via telephone, all other money transactions between entities initiated by a telephone call are incorporated into the present invention.

Moreover, while the present invention is described with reference to payments made by the callee, the present invention also incorporates financial transactions from the caller to the callee. In addition, the caller preferably provides information according to the RVID for updating a callee profile to indicate the products or services purchased.

An advantage of the present invention is that a telemarketing company may receive payment from a callee without requiring the callee to provide a credit card number or other direct account number. In another example, a child may call a parent, requesting money for an account. The child indicates the parent may authorize transfer of a particular amount of money from the parent's account to the child's account, without revealing an account number or requiring an additional call to the account provider or sending a check to the child. Other examples will also be understood to include situations where it is advantageous for a financial transaction to occur during a call between two parties.

Figure 7:
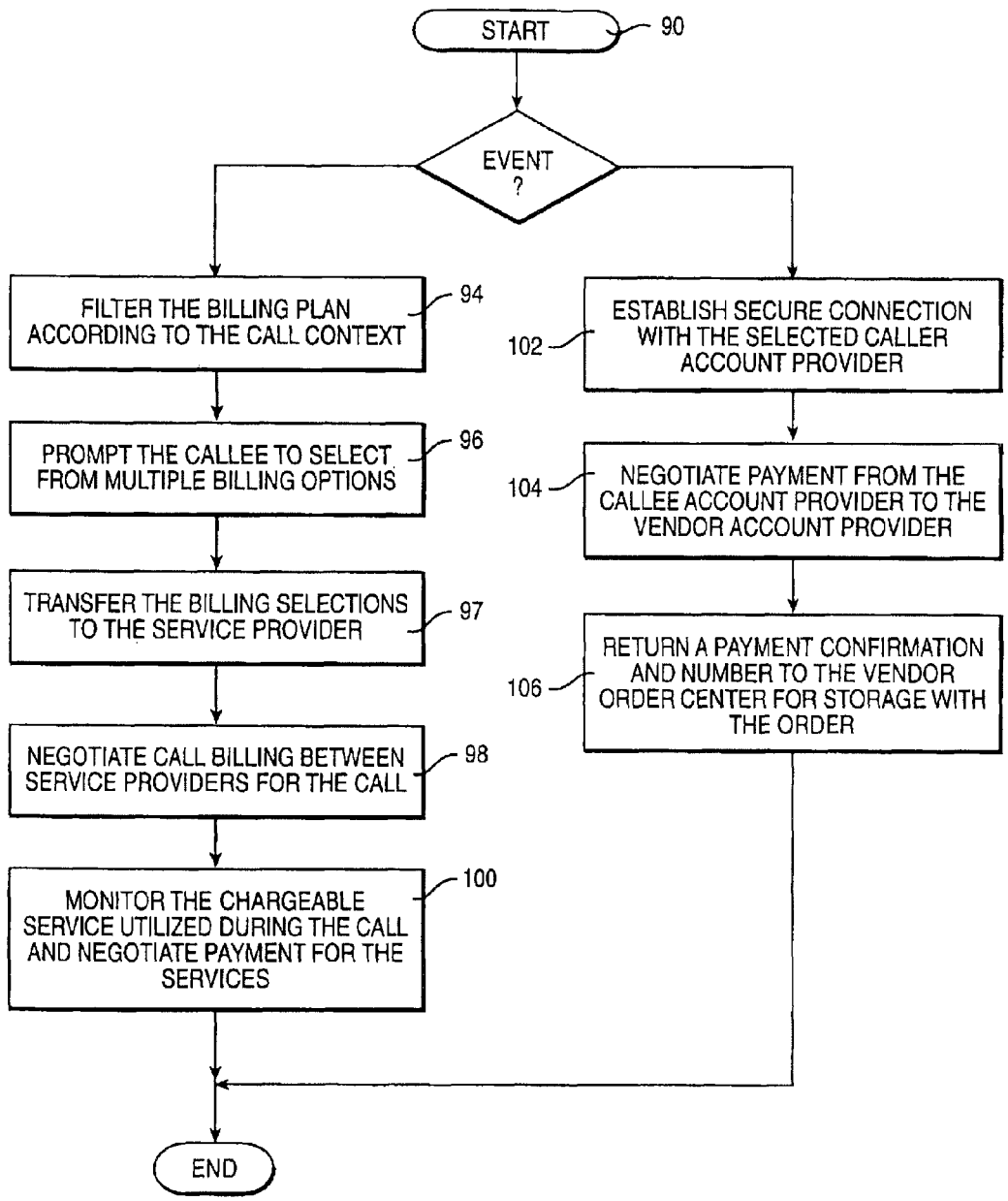
FIG. 7 depicts a high level logic flowchart of a process and program for controlling a billing service in accordance with the method, system, and program of the present invention.

Referring now to FIG. 7, there is depicted a high level logic flowchart of a process and program for controlling a billing service in accordance with the method, system, and program of the present invention. As illustrated. As illustrated, the process starts at block 90 and thereafter proceeds to block 92. Block 92 depicts a determination as to what event occurred when an event occurs. If a RVID/billing plan are received for a new call, then the process passes to block 94. If an order is received, then the process passes to block 102.

Block 94 depicts filtering the callee billing plan according to the call context. Next, block 96 illustrates prompting the callee to select from multiple options in the billing plan after filtering. For example, if the callee has multiple wireless providers for a wireless call, then the callee may be prompted to select one wireless provider for providing telephone services for the call. Thereafter, block 97 depicts transferring the billing selections to the current service provider, such that the call may be switched to the selected service provider or remain at the current service provider but charge the selected service provider account. In particular, block 98 illustrates negotiating billing between service providers for the call, when needed. Next, block 100 illustrates monitoring chargeable service utilized during the call and negotiating payment for those services from the callee account providers.

Block 102 depicts establishing a secure connection with the callee account provider selected in an order. If more than one callee account provider is selected for an order for split billing, then multiple callee account providers may be contacted. Next, block 104 illustrates negotiating payment from the callee account provider to a vendor account provider.

Thereafter, block 106 depicts returning an payment number and confirmation to the vendor order center, and the process ends.

Figure 8:
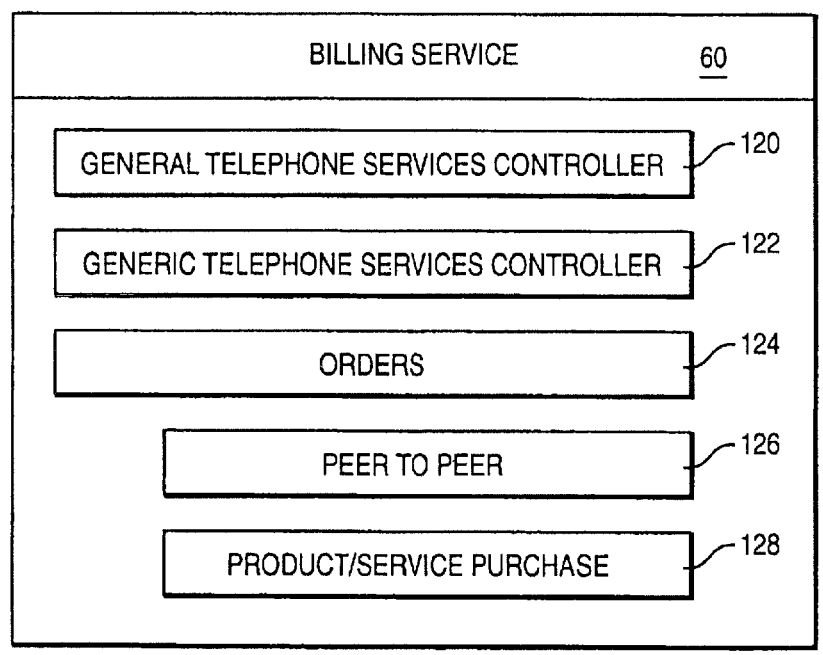
FIG. 8 illustrates a block diagram of the billing service in accordance with the method, system, and program of the present invention.

With reference now to FIG. 8, there is illustrated a block diagram of the billing service in accordance with the method, system, and program of the present invention. As depicted, billing service 60 preferably includes multiple selectable service controllers.

For controlling billing for general telephone services, general telephone service controller 120 is initiated. General telephone service controller 120 preferably determines the service provider for a call and coordinates transfer of the call to that service provider or payment to the current service provider.

For controlling billing for billable telephone services, such as long distance service, generic telephone service controller 122 is initiated. Generic telephone service controller 122 preferably monitors billable services during a call and negotiates payment for those services by a callee account provider.

For controlling other financial transaction orders, callers may request different order services from among order services 124. Any of order services 124 may be initiated by a caller or callee. The billing service automatically captures the caller VID and callee RVID to facilitate the transaction.

In particular, a peer-to-peer service 126 preferably processes an order for a shift in financial funds from the callee to the caller, initiated by either the caller or callee. Peer-to-peer service 126 may prompt the callee to provide the transfer amount and select an account provider and prompt the caller to select an account provider.

In addition, a product/service purchase service 128 processes an order for a payment from the callee for a product or service purchased from the caller. Product/service purchase service 128 preferably receives account provider selections and an order amount and description to facilitate the transaction.

While the present invention has been described with reference to billing a single callee account provider, in alternate embodiments, multiple callees may be billed during a call, where each callee logs onto the call with a voice authentication and the RVIDs of each callee are utilized. For example, where a caller calls a callee and talks with the callee for a particular amount of time, but then would like to speak to another person available during the same call, the new callee preferably logs on with an RVID and billing continues for the RVID billing plan.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   receiving, by a billing service communicatively connected through a data network to a destination telephony device for a first subscriber, an authenticated identifier for said first subscriber at said destination telephony device during a data signal transmission with a second subscriber, wherein said authenticated identifier authenticates an identity of said first subscriber with a first subscriber voice authenticated identifier through a voice sample provided by said first subscriber during said data signal transmission from an authentication service communicatively connected with said data network;
   retrieving, by said billing service, billing specifications for said first subscriber according to said authenticated identifier; and
   processing, by said billing service, a payment from said first subscriber to said second subscriber with said billing specifications.

2. The method according to claim 1, further comprising:
   automatically filling in an order form with said billing specifications for an order placed by said first subscriber, wherein said billing specifications specify at least one billing provider for fulfilling said payment for said order from said first subscriber to said second subscriber.

3. The method according to claim 2, further comprising:
   transmitting said order form to said first subscriber at said destination device, wherein said first subscriber is able to complete said order by a single authorization entry at said destination device to authorize said billing service to access said at least one billing provider with said authenticated identifier.

4. The method according to claim 2, further comprising:
   accessing, by said billing service, said at least one billing provider with said authenticated identifier to request said payment for said order from said at least one billing provider according to said authenticated identifier and not according to account numbers.

5. The method according to claim 2, further comprising:
   receiving a request by said first subscriber at said destination telephony device to initiate said order to shift financial funds from said first subscriber to said second subscriber, where said billing service identifies an account provider for said second subscriber;
   prompting said first subscriber at said destination telephony device to enter an amount to transfer and to select a particular billing provider from among said at least one billing provider specified in said billing specifications for said first subscriber according to said authenticated identifier for said first subscriber; and
   requesting a financial transaction from said particular billing provider for said amount to said account provider for said second subscriber according to said authenticated identifier for said first subscriber.

6. The method according to claim 2, further comprising:
   receiving a request by said first subscriber at said destination telephony device to initiate said order to shift financial funds from said first subscriber to said second subscriber;
   capturing said authenticated identifier for said first subscriber and a second authenticated identifier for said second subscriber;
   retrieving caller billing specification for said second subscriber according to said second authenticated identifier for said second subscriber;

prompting said first subscriber at said destination device to enter an amount to transfer and to select a particular billing provider from among said at least one billing provider specified in said billing specifications for said first subscriber according to said authenticated identifier for said first subscriber;

prompting said second subscriber at said origin device to select a particular second subscriber account provider from among at least one account provider specified in said second subscriber billing specifications; and requesting a financial transaction from said particular billing provider for said amount to said particular account provider for said second subscriber according to said authenticated identifier for said first subscriber.

7. The method according to claim 1, further comprising:
receiving said authenticated identifier by said billing service located outside said data network and communicatively connected through said data network through a signaling gateway, wherein an additional level of security verification is provided through said signaling gateway for said billing service to communicatively connect with said destination telephony device through said data network.

8. The method according to claim 1, further comprising:
controlling billing for billable use of data transmission services through said data network and billing for financial transaction orders placed during a plurality of data signal transmissions across said data network.

9. A system comprising:
a non-transitory memory storing subscriber authentication information comprising a first subscriber authenticated identifier; and one or more hardware processors in communication with said non-transitory memory and configured to:

receive, by a billing service communicatively connected through a data network to a destination telephony device for a first subscriber, an authenticated identifier for said first subscriber at said destination telephony device during a data signal transmission with a second subscriber, wherein said authenticated identifier authenticates an identity of said first subscriber with a first subscriber voice authenticated identifier through a voice sample provided by said first subscriber during said data signal transmission from an authentication service communicatively connected with said data network;

retrieve, by said billing service, billing specifications for said first subscriber according to said authenticated identifier; and process, by said billing service, a payment from said first subscriber to said second subscriber with said billing specifications.

10. The system of claim 9, wherein said one or more hardware processors is further configured to:
automatically fill in an order form with said billing specifications for an order placed by said first subscriber, wherein said billing specifications specify at least one billing provider for fulfilling said payment for said order from said first subscriber to said second subscriber.

11. The system of claim 10, wherein said one or more hardware processors is further configured to:
transmit said order form to said first subscriber at said destination device, wherein said first subscriber is able to complete said order by a single authorization entry at said destination device to authorize said billing service to access said at least one billing provider with said authenticated identifier.

12. The system of claim 10, wherein said one or more hardware processors is further configured to:
access said at least one billing provider with said authenticated identifier to request said payment for said order from said at least one billing provider according to said authenticated identifier and not according to account numbers.

13. The system of claim 10, wherein said one or more hardware processors is further configured to:
receive a request by said first subscriber at said destination telephony device to initiate said order to shift financial funds from said first subscriber to said second subscriber, where said billing service identifies an account provider for said second subscriber;

prompt said first subscriber at said destination telephony device to enter an amount to transfer and to select a particular billing provider from among said at least one billing provider specified in said billing specifications for said first subscriber according to said authenticated identifier for said first subscriber; and request a financial transaction from said particular billing provider for said amount to said account provider for said second subscriber according to said authenticated identifier for said first subscriber.

14. The system of claim 10, wherein said one or more hardware processors is further configured to:
receive, by said billing service, a request by said first subscriber at said destination telephony device to initiate said order to shift financial funds from said first subscriber to said second subscriber;

capture said authenticated identifier for said first subscriber and a second authenticated identifier for said second subscriber;

retrieve caller billing specification for said second subscriber according to said second authenticated identifier for said second subscriber;

prompt said first subscriber at said destination device to enter an amount to transfer and to select a particular billing provider from among said at least one billing provider specified in said billing specifications for said first subscriber according to said authenticated identifier for said first subscriber;

prompt said second subscriber at said origin device to select a particular second subscriber account provider from among at least one account provider specified in said second subscriber billing specifications; and request a financial transaction from said particular billing provider for said amount to said particular account provider for said second subscriber according to said authenticated identifier for said first subscriber.

15. The system of claim 9, wherein the one or more hardware processors is further configured to:
receive said authenticated identifier by said billing service located outside said data network and communicatively connected through said data network through a signaling gateway, wherein an additional level of security verification is provided through said signaling gateway for said billing service to communicatively connect with said destination telephony device through said data network.

16. The system of claim 9, wherein said one or more hardware processors is further configured to:
controlling, by said same billing service, billing for billable use of data transmission services through said data network and billing for financial transaction orders placed during a plurality of data signal transmissions across said data network.

17. A non-transitory computer readable medium comprising a plurality of machine-readable instructions which when executed by one or more processors of a billing service are adapted to cause said billing service to perform a method comprising:

receiving, by said billing service communicatively connected through a data network to a destination telephony device for a first subscriber, an authenticated identifier for said first subscriber at said destination telephony device during a data signal transmission with a second subscriber, wherein said authenticated identifier authenticates an identity of said first subscriber with a first subscriber voice authenticated identifier through a voice sample provided by said first subscriber during said data signal transmission from an authentication service communicatively connected with said data network;

retrieving, by said billing service, billing specifications for said first subscriber according to said authenticated identifier;

processing, by said billing service, a payment from said first subscriber to said second subscriber with said billing specifications; and transmitting said order form to said first subscriber at said destination device.

18. The non-transitory computer readable medium of claim 17, wherein said identifier provided by said first subscriber is one of a voice identifier, an eye scan, a fingerprint, and a keypad entry.

\* \* \* \* \*